(12) United States Patent
Hong et al.

(10) Patent No.: US 10,592,054 B2
(45) Date of Patent: Mar. 17, 2020

(54) ELECTRONIC APPARATUS

(71) Applicants: Samsung Display Co., Ltd., Yongin-si, Gyeonggi-do (KR); SNU R&DB FOUNDATION, Seoul (KR)

(72) Inventors: Jongho Hong, Yongin-si (KR); Minwoo Kim, Hwaseong-si (KR); Wonsang Park, Yongin-si (KR); Hyeyong Chu, Hwaseong-si (KR); Dae-Hyeong Kim, Incheon (KR); Jaemin Kim, Seoul (KR); Jun Kyul Song, Seoul (KR)

(73) Assignees: Samsung Display Co., Ltd. (KR); SEOUL NATIONAL UNIVERSITY R&DB FOUNDATION (KR)

( * ) Notice: Subject to any disclaimer, the term of this patent is extended or adjusted under 35 U.S.C. 154(b) by 260 days.

(21) Appl. No.: 15/850,354

(22) Filed: Dec. 21, 2017

(65) Prior Publication Data

US 2018/0260053 A1 Sep. 13, 2018

(30) Foreign Application Priority Data

Mar. 7, 2017 (KR) ........................ 10-2017-0029017

(51) Int. Cl.
*G06F 3/044* (2006.01)
*G06F 3/041* (2006.01)

(52) U.S. Cl.
CPC ............ *G06F 3/044* (2013.01); *G06F 3/0414* (2013.01); *G06F 2203/04105* (2013.01); *G06F 2203/04111* (2013.01)

(58) Field of Classification Search
CPC ................... G06F 3/044; G06F 3/0414; G06F 2203/04111; G06F 2203/04105
See application file for complete search history.

(56) References Cited

U.S. PATENT DOCUMENTS

2014/0020484 A1* 1/2014 Shaw ...................... G01L 1/146
73/862.625
2016/0195955 A1* 7/2016 Picciotto ................ G06F 3/044
345/174
(Continued)

FOREIGN PATENT DOCUMENTS

KR 101297040 8/2013
KR 101579391 12/2015
(Continued)

OTHER PUBLICATIONS

Song et al., "Wearable Force Touch Sensor Array Using a Flexible and Transparent Electrode," Adv. Fund. Mater. 2017, 1605286, 9 pages.
(Continued)

*Primary Examiner* — Andrew Sasinowski
(74) *Attorney, Agent, or Firm* — Innovation Counsel LLP

(57) ABSTRACT

An electronic apparatus may include a base layer and a sensing unit disposed on the base layer to sense a touch event. The sensing unit may include touch sensor unit configured to sense a position of the touch event and pressure sensor unit configured to sense a magnitude of the touch event. The touch sensor unit may include a touch sensing pattern including a first transparent electrode layer, a first metal layer, and a first resin layer. The pressure sensor unit may include a pressure sensing pattern including a second transparent electrode layer, a second metal layer, and a second resin layer.

20 Claims, 14 Drawing Sheets

(56) References Cited

U.S. PATENT DOCUMENTS

2016/0209961 A1* 7/2016 Ahn ................. G06F 3/0414
2016/0342257 A1* 11/2016 Watazu ............. G06F 3/0414

FOREIGN PATENT DOCUMENTS

| KR | 1020160000100 | 1/2016 |
| KR | 101626766 | 6/2016 |
| KR | 1020170121368 | 11/2017 |

OTHER PUBLICATIONS

Yeom et al., "Large-Area Compliant Tactile Sensors Using Printed Carbon Nanotube Active-Matrix Backplanes," Advanced Materials 2015, 27, pp. 1561-1566.

Pan et al., "An Ultra-Sensitive Resistive Pressure Sensor Based on Hollow-Sphere Microstructure Induced Elasticity in Conducting Polymer Film," Nature Communications, 5 3002, 2014 Macmillan Publishers Limited, 8 pages.

Kang et al., "Polymer-Metal Hybrid Transparent Electrodes for Flexible Electronics," Nature Communications, 6 6503, 2015 Macmillan Publishers Limited, 7 pages.

Takei et al., "Nanowire active-matrix circuitry for low-voltage macroscale artificial skin," Nature Materials, 9 821, 2010, 7 pages.

Park et al., "Oxide Nanomembrane Hybrids with Enhanced Mechano- and Thermo-Sensitivity for Semitransparent Epidermal Electronics," Adv. Healthcare Mater. 2015, 4, 992-997.

* cited by examiner

ELECTRONIC APPARATUS

CROSS-REFERENCE TO RELATED APPLICATIONS

This U.S. patent application claims priority to Korean Patent Application No. 10-2017-0029017, filed on Mar. 7, 2017, in the Korean Intellectual Property Office, the disclose of which is herein incorporated by reference in its entirety.

BACKGROUND OF THE INVENTION

1. Field

The present disclosure relates to an electronic apparatus, and in particular, to an electronic apparatus configured to sense a touch event.

2. Description of the Related Art

An electronic apparatus is activated by an electrical signal. The electronic apparatus may be used to detect a touch event through an activation region. For example, the electronic apparatus includes a plurality of conductive patterns that are used to transmit electrical signals for activating the electronic apparatus. A region, in which conductive patterns are activated, may response to an external touch event. Information on the touch event detected by the electronic apparatus can be used to operate or control various applications.

SUMMARY

Some embodiments of the inventive concept provide an electronic apparatus configured to detect a position and a magnitude of a touch event.

According to some embodiments of the inventive concept, an electronic apparatus may include a base layer and a sensing unit disposed on the base layer to sense a touch event. The sensing unit may include a touch sensor unit that is configured to sense a position of the touch event, and a pressure sensor unit that is configured to sense a magnitude of the touch event. The touch sensor unit may include a touch sensing pattern including a first transparent electrode layer, a first metal layer disposed on the first transparent electrode layer, and a first resin layer disposed on the first metal layer. The pressure sensor unit may include a pressure sensing pattern including a second transparent electrode layer, a second metal layer disposed on the second transparent electrode layer, and a second resin layer disposed on the second metal layer.

In some embodiments, the touch sensor unit and the pressure sensor unit may extend in a first direction and may be alternatingly arranged in a second direction crossing the first direction.

In some embodiments, each of the first transparent electrode layer and the second transparent electrode layer may include indium tin oxide (ITO).

In some embodiments, each of the first metal layer and the second metal layer may include copper.

In some embodiments, each of the first resin layer and the second resin layer may include an epoxy resin.

In some embodiments, a thickness of the first metal layer may be smaller than that of each of the first resin layer and the first transparent electrode layer, and a thickness of the second metal layer may be smaller than that of each of the second resin layer and the second transparent electrode layer.

In some embodiments, the thickness of each of the first metal layer and the second metal layer may range from 5 nm to 9 nm.

In some embodiments, the thickness of each of the first resin layer and the second resin layer may be approximately 70 nm.

In some embodiments, the touch sensing pattern may include a first sensing pattern and a first floating sensing pattern that are disposed on the base layer and a second sensing pattern that are disposed on the first sensing pattern and the first floating sensing pattern, and each of the first sensing pattern, the first floating sensing pattern, and the second sensing pattern may include the first transparent electrode layer, the first metal layer disposed on the first transparent electrode layer, and the first resin layer disposed on the first metal layer.

In some embodiments, the second sensing pattern may include a connection sensing pattern and a second floating sensing pattern, the connection sensing pattern may be electrically connected to the first floating sensing pattern, and the second floating sensing pattern may be physically separated from the connection sensing pattern.

In some embodiments, the first resin layer may be removed from a first region of the second floating sensing pattern and a second region of the connection sensing pattern that is adjacent to the first region to expose a first portion of the first metal layer in the first region and a second portion of the first metal layer in the second region, and the second floating sensing pattern and the connection sensing pattern may be electrically connected to each other, when a conductive object is in contact with the exposed first and second portions of the first metal layer in the first and second regions.

In some embodiments, the pressure sensing pattern may include a strain gauge that is disposed on the base layer, and a sensing pattern that is connected to the strain gauge, and the sensing pattern may include the second transparent electrode layer, the second metal layer disposed on the second transparent electrode layer, and the second resin layer disposed on the second metal layer.

In some embodiments, the touch sensing pattern may include a first sensing pattern and a second sensing pattern. The touch sensing unit may be configured to sense a touch event through an electrostatic capacitive coupling between the first sensing pattern and the second sensing pattern.

In some embodiments, the electronic apparatus may further include an insulating layer disposed between the first sensing pattern and the second sensing pattern. Each of the first sensing pattern and the second sensing pattern may include the first transparent electrode layer, the first metal layer disposed on the first transparent electrode layer, and the first resin layer disposed on the first metal layer.

In some embodiments, the first sensing pattern and the second sensing pattern may be provided at a same level, and each of the first sensing pattern and the second sensing pattern may include the first transparent electrode layer, the first metal layer disposed on the first transparent electrode layer, and the first resin layer disposed on the first metal layer.

In some embodiments, the electronic apparatus may further include a display panel that is disposed below the base layer and is used to display an image.

In some embodiments, the base layer may be flexible.

In some embodiments, each of the touch sensing pattern and the pressure sensing pattern may have a shape meanderingly extending in a predetermined direction.

According to some embodiments of the inventive concept, an electronic apparatus may include a base layer having a flexible property, first sensing patterns including a first transparent electrode layer disposed on the base layer, a first metal layer directly disposed on the first transparent electrode layer, and a first resin layer directly disposed on the first metal layer, an insulating layer covering the first sensing patterns, and second sensing patterns including a second transparent electrode layer disposed on the insulating layer, a second metal layer directly disposed on the second transparent electrode layer, and a second resin layer directly disposed on the second metal layer.

In some embodiments, each of the first and second sensing patterns may include a first portion that is used to sense a position of a touch event, and a second portion that is used to sense a magnitude of the touch event.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
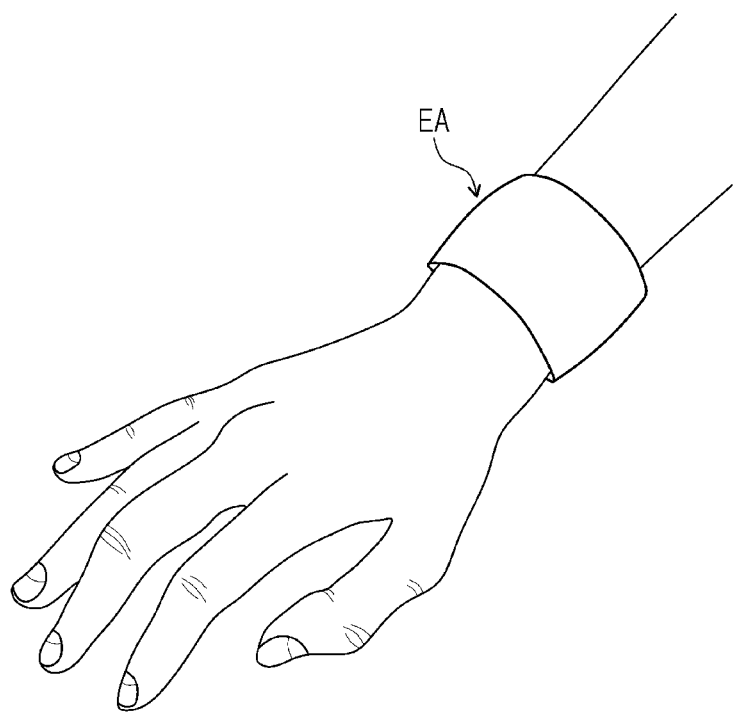
FIG. 1 is a perspective view illustrating an example, in which an electronic apparatus according to some embodiments of the inventive concept is used.

It should be noted that these figures are intended to illustrate the general characteristics of methods, structure, and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions, and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that the present disclosure will be thorough and complete, and will fully convey the concept of example embodiments to those of ordinary skill in the art. In the drawings, the thicknesses of layers and regions may be exaggerated for clarity. Like reference numerals in the drawings denote like elements, and thus their duplicate description may be omitted.

It will be understood that when an element is referred to as being "connected" or "coupled" to another element, it can be directly connected or coupled to the other element or one or more intervening elements may be present. In contrast, when an element is referred to as being "directly connected" or "directly coupled" to another element, there may be no intervening elements present. Like numbers indicate like elements throughout. As used herein, the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an," and "the" are intended to include the plural forms as well, unless the context clearly indicates otherwise. It will be further understood that the terms "comprises", "comprising", "includes," and/or "including," used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a perspective view illustrating an example, in which an electronic apparatus according to some embodiments of the inventive concept is used.

Referring to FIG. 1, an electronic apparatus EA may be a device configured to detect a touch event (also referred to as an external touch). The external touch may be provided in various manners. The electronic apparatus EA may be configured to detect a change in a distance or a contact state between the electronic apparatus DA and a part of a body (e.g., a user's hand) or a part of a non-living object (e.g., a stylus pen).

In FIG. 1, a watch is illustrated as an example of the electronic apparatus EA. The electronic apparatus EA may have a flexible property, and thus, a shape of the electronic apparatus EA may be freely changed. For example, the electronic apparatus EA according to some embodiments of the inventive concept may be applied to various electronic apparatuses, such as foldable, rollable, and stretchable electronic apparatuses. However, it should be understood that these are merely examples of the inventive concept, and that other electronic devices may be used to realize the inventive concept.

The electronic apparatus EA may be configured to sense and process a bio-signal that may occur when the electronic apparatus EA is in contact with a human body, or to provide information to a user in cooperation with a user's electronic terminal (e.g., a smart phone or a tablet). The electronic apparatus EA may include an application for controlling a drone, an RC car, and so forth. The electronic apparatus EA may be used or implemented in various manners, besides the examples listed.

Figure 2:
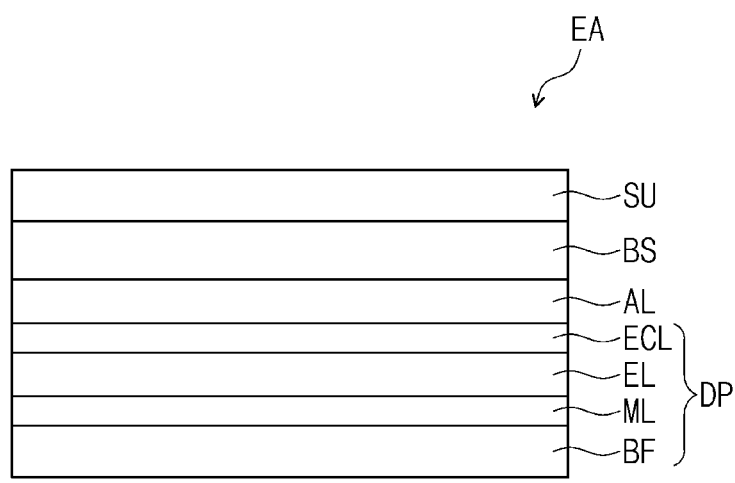
FIG. 2 is a sectional view schematically illustrating an electronic apparatus according to some embodiments of the inventive concept.

FIG. 2 is a sectional view schematically illustrating an electronic apparatus according to some embodiments of the inventive concept.

Referring to FIG. 2, the electronic apparatus EA may include a display panel DP, a base layer BS, and a sensing unit SU.

The display panel DP may be configured to produce an image, based on image data to be input thereto. FIG. 2 illustrates an example, in which an organic light emitting display panel is used as the display panel DP, but the inventive concept is not limited thereto. In another example, the display panel DP may be a liquid crystal display panel, a plasma display panel, or an electrophoresis display panel.

The display panel DP may include a base film BF, a circuit layer ML, a luminescent device layer EL, and an encapsulation layer ECL. The circuit layer ML may be disposed on the base film BF, the luminescent device layer EL may be disposed on the circuit layer ML, and the encapsulation layer ECL may be disposed on the luminescent device layer EL.

The base film BF may be or include a plastic substrate, a glass substrate, a metal substrate, or a substrate made of an organic/inorganic composite material. The plastic substrate may include at least one of acrylic resins, methacryl resins, polyisoprene resins, vinyl resins, epoxy resins, urethane resins, cellulose resins, siloxane resins, polyimide resins, polyamide resins, or perylene resins.

The circuit layer ML may include a plurality of insulating layers, a plurality of conductive layers, and at least on semiconductor layer. The plurality of conductive layers in the circuit layer ML may provide signal lines or a control circuit of a pixel.

The luminescent device layer EL may include organic light-emitting diodes.

The encapsulation layer ECL may be configured to hermetically seal the luminescent device layer EL. The encapsulation layer ECL may include a plurality of inorganic layers and at least one organic layer interposed therebetween. The inorganic layers may protect the luminescent device layer EL from moisture and oxygen, and the organic layer may protect the luminescent device layer EL from foreign substances (e.g., dust particles).

The base layer BS may be disposed on the display panel DP. The base layer BS may include a transparent plastic film. Herein, the expression 'transparent' may be used to represent optical transparency higher than 0%, and thus, it may also be used to represent a semitransparent property. The optical transparency can be understood herein as an optical transmittance.

The sensing unit SU may be disposed on the base layer BS. The sensing unit SU may be configured to measure a position and a strength of a touch event (or "external touch").

An adhesive layer AL may be provided to attach the display panel DP to the base layer BS. The adhesive layer AL may be formed of or include an organic adhesive layer (e.g., an optically clear adhesive (OCA) film, an optically clear resin (OCR) film, or a pressure sensitive adhesive (PSA) film). The organic adhesive layer may include adhesive materials, such as polyurethanes, polyacrylic, polyester, polyepoxy, and polyvinyl acetate materials.

Figure 3:
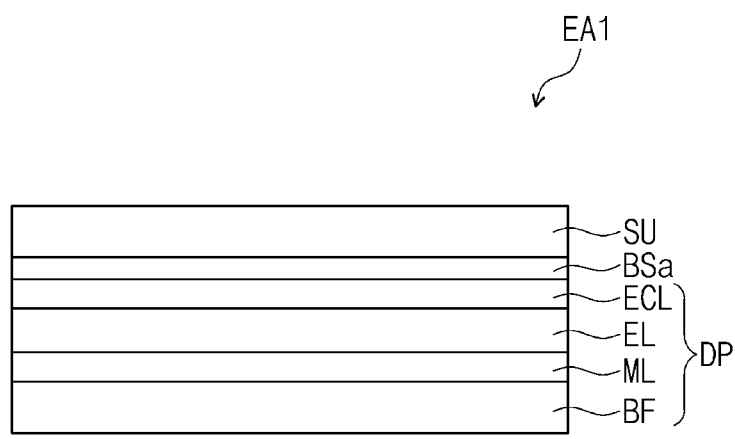
FIG. 3 is a sectional view schematically illustrating an electronic apparatus according to some embodiments of the inventive concept.

FIG. 3 is a sectional view schematically illustrating an electronic apparatus according to some embodiments of the inventive concept. In the following description of FIG. 3, an element previously described with reference to FIG. 2 may be identified by a similar or identical reference number, and a duplicate description thereof may be omitted for the sake of brevity.

Referring to FIG. 3, an electronic apparatus EA1 may include a display panel DP, a base layer BSa, and a sensing unit SU. The base layer BSa may be directly disposed on the display panel DP, and the sensing unit SU may be directly disposed on the base layer BSa. In the present specification, the expression "be directly disposed" is used to represent that two layers are successively formed on top of each other, without an adhesive layer formed therebetween.

The base layer BSa may be used as a buffer layer. The buffer layer BSa may be an inorganic layer or an organic layer. The inorganic layer may include at least one of silicon nitride, silicon oxynitride, silicon oxide, titanium oxide, or aluminum oxide. The organic layer may include polymers (e.g., acrylic organic materials). However, the inventive concept is not limited thereto. In some embodiments, the base layer BSa and the encapsulation layer ECL may be two different elements, as shown in FIG. 3, but in other embodiments, the base layer BSa may be provided as a part of the encapsulation layer ECL.

Since, as shown in FIGS. 2 and 3, each of the electronic apparatuses EA and EA1 includes the display panel DP, it may be used to obtain information from an external touch and display an image. In this case, the electronic apparatus can detect a user's input and provide information that is produced in response to the user's input to the user. However, in some embodiments, there may be no display panel in the electronic apparatus.

Figure 4:
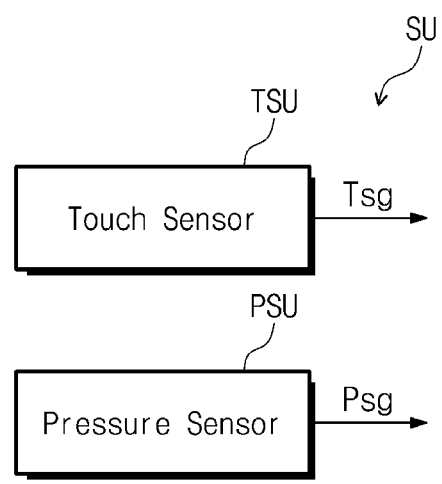
FIG. 4 is a schematic block diagram provided to describe a sensing unit according to some embodiments of the inventive concept.
Figure 5:
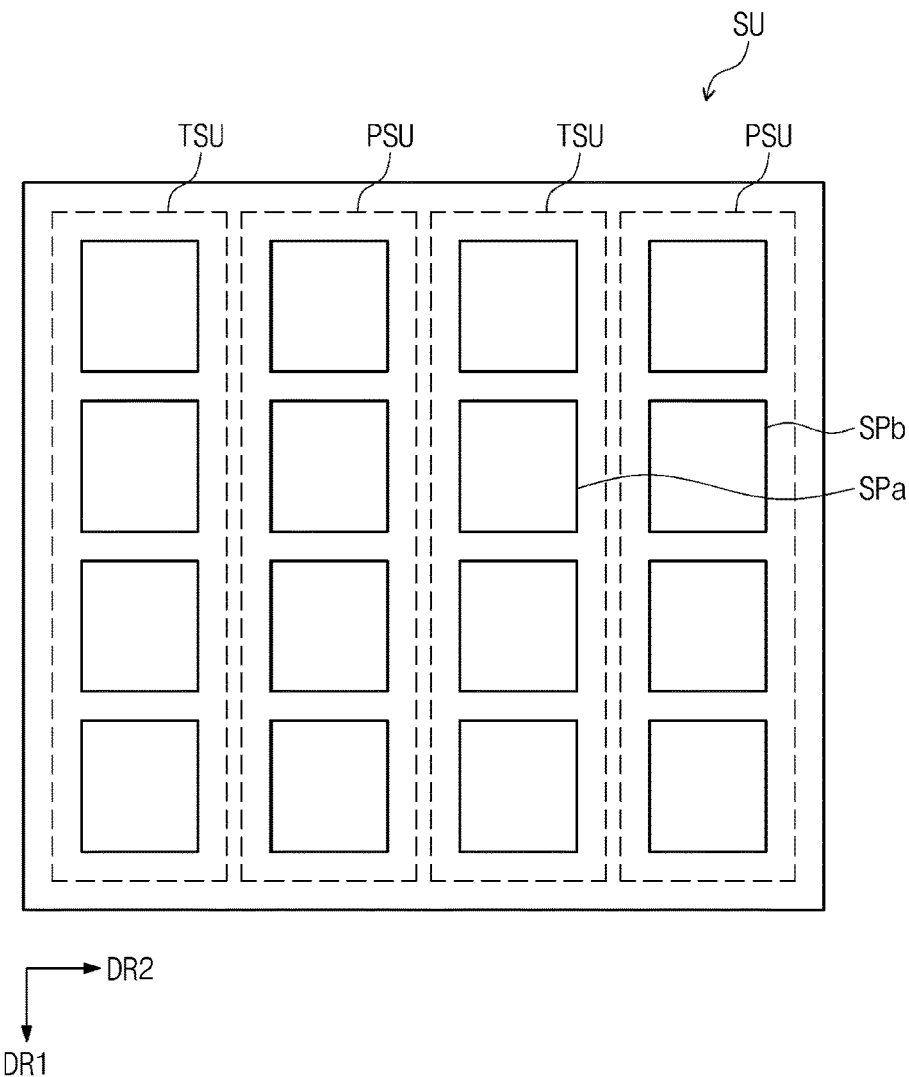
FIG. 5 is a plan view schematically illustrating a sensing unit according to some embodiments of the inventive concept.

FIG. 4 is a schematic block diagram provided to describe a sensing unit according to some embodiments of the inventive concept, and FIG. 5 is a plan view schematically illustrating a sensing unit according to some embodiments of the inventive concept.

Referring to FIGS. 4 and 5, the sensing unit SU may include a touch sensor unit TSU and a pressure sensor unit PSU. The touch sensor unit TSU may be used to obtain information on a position of an external touch, and the pressure sensor unit PSU may be configured to obtain information on a strength of the external touch.

In addition, the touch sensor unit TSU may be configured to output a first sensing signal Tsg including the position information of the touch to a driving circuit (not shown), and the pressure sensor unit PSU may be configured to output a second sensing signal Psg including the strength information of the touch to the driving circuit.

The touch and pressure sensor units TSU and PSU may be arranged to be spaced apart from each other in a second direction DR2, and each of the touch and pressure sensor units TSU and PSU may extend in a first direction DR1. In some embodiments, the touch and pressure sensor units TSU and PSU may be arranged in an alternating manner in the second direction DR2. Since the touch sensor unit TSU is separated from the pressure sensor unit PSU, sensitivity of each of the touch and pressure sensor units TSU and PSU can be improved. Although FIG. 5 illustrates an example in which the sensing unit SU has two touch sensor units TSU and two pressure sensor units PSU, the inventive concept is not limited to such an example. For example, the number of the touch and pressure sensor units TSU and PSU may be changed based on the requirements (e.g., in size or resolution) of an electronic apparatus.

Each of the touch and pressure sensor units TSU and PSU may include a plurality of sensing patterns SPa and SPb, each of which is used to sense a touch event. A sensing pattern of the touch sensor unit TSU will be referred to as a touch sensing pattern SPa, and a sensing pattern of the pressure sensor unit PSU will be referred to as a pressure sensing pattern SPb. In the sensing unit SU, the touch sensing pattern SPa may be used to obtain information on a position of a touch, and the pressure sensing pattern SPb may be used to obtain information on a strength of the touch.

The touch sensing pattern SPa and the pressure sensing pattern SPb may be optically transparent allowing a user to see an image under the sensing unit SU. In addition, the touch and pressure sensing patterns SPa and SPb may be flexible while having strength to endure repeated deformation, and the electronic apparatus EA including the touch and pressure sensing patterns SPa and SPb can have the sufficient flexibility to be realized as a watch as described with reference to FIG. 1.

Figure 6:
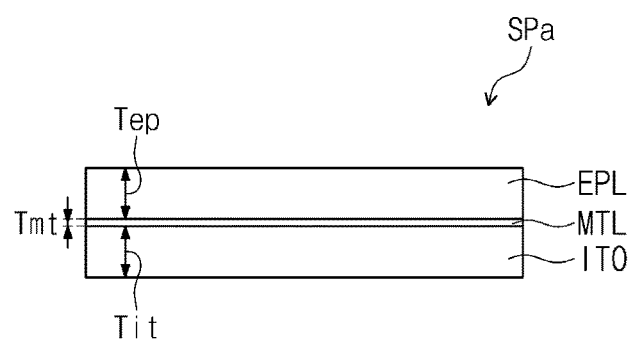
FIG. 6 is a sectional view schematically illustrating a sensing pattern according to some embodiments of the inventive concept.

FIG. 6 is a sectional view schematically illustrating a sensing pattern according to some embodiments of the inventive concept.

A vertical section of a single pattern layer providing the touch sensing pattern SPa is schematically illustrated in FIG. 6. The pressure sensing pattern SPb may be configured to have the same layer structure as that of the touch sensing pattern SPa. Thus, a detailed description of a layer structure of the pressure sensing pattern SPb will be omitted for the sake of brevity.

The touch sensing pattern SPa may include a transparent electrode layer ITO, a metal layer MTL, and a resin layer EPL.

The transparent electrode layer ITO may be formed of or include at least one of transparent conductive oxide materials. For example, the transparent electrode layer ITO may include indium tin oxide (ITO), but the inventive concept is not limited thereto. For example, the transparent electrode layer ITO may include at least one of indium zinc oxide (IZO), indium gallium oxide (IGO), indium zinc gallium oxide (IGZO), and mixtures and compounds thereof.

The metal layer MTL may be directly disposed on the transparent electrode layer ITO. The metal layer MTL may be configured to increase conductivity of the touch sensing pattern SPa. The metal layer MTL may be formed on the transparent electrode layer ITO by using a deposition process. The metal layer MTL may be formed of or include copper, but the inventive concept is not limited thereto. For example, the metal layer MTL may be formed of or include at least one of gold and silver.

The resin layer EPL may be directly disposed on the metal layer MTL. The resin layer EPL may be configured to increase transparency of the touch sensing pattern SPa and to prevent the metal layer MTL from being cracked by a stress. The resin layer EPL may be formed on the metal layer MTL by a spin coating process. The resin layer EPL may be formed of or include at least one of epoxy resins, but the inventive concept is not limited thereto. For example, a transparent polymer material may be used for the resin layer EPL. Polyimide (PI) and polymethyl methacrylate (PMMA) may be used as the transparent polymer material, but the inventive concept is not limited thereto.

The transparent electrode layer ITO may be formed to have a first thickness Tit, the metal layer MTL may be formed to have a second thickness Tmt, and the resin layer EPL may be formed to have a third thickness Tep. The second thickness Tmt of the metal layer MTL may be smaller than the first thickness Tit of the transparent electrode layer ITO and the third thickness Tep of the resin layer EPL.

The second thickness Tmt may be determined in consideration of electric conductivity and optical transparency of the metal layer MTL. For example, when light with 600 nm wavelength is incident into a copper-containing metal layer, the metal layer having a thickness of 9 nm may have 80% of optical transparency and 17Ω of electrical resistance, and the metal layer having a thickness of 5 nm may have 92% of optical transparency and 78Ω of electrical resistance. In some embodiments, the second thickness Tmt of the metal layer MTL may be selected within a range of 5 nm to 9 nm.

The third thickness Tep of the resin layer EPL may be selected, after determining the second thickness Tmt of the metal layer MTL. In some embodiments, transparency of visible light passing through a stacked structure including the metal layer MTL and the resin layer EPL is measured while changing a thickness of the resin layer EPL, and then, a thickness, at which the highest transparency is measured, may be determined to be the third thickness Tep of the resin layer EPL. For example, the third thickness Tep of the resin layer EPL may be approximately 70 nm.

Figure 7:
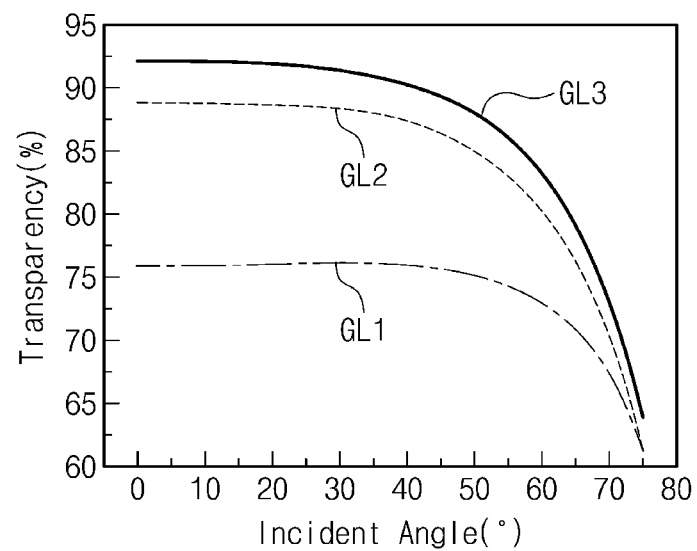
FIG. 7 is a graph showing light transparency versus incident angle.

FIG. 7 is a graph showing light transparency versus incident angle.

Referring to FIG. 7, a first curve GL1 and a second curve GL2 are obtained from samples according to comparative examples, and a third curve GL3 is obtained from a sample according to some embodiments of the inventive concept. For example, the first curve GL1 is obtained from a sensing pattern, in which a transparent electrode layer and a metal layer are sequentially stacked, according to a first comparative example, and the second curve GL2 is obtained from a sensing pattern, in which a first transparent electrode layer, a metal layer, and a second transparent electrode layer are sequentially stacked, according to a second comparative example. The third curve GL3 was obtained from a sensing pattern that is formed to have the same structure as that shown in FIG. 6.

The first to third curves GL1, GL2, and GL3 are obtained by irradiating the sensing patterns with light of 600 nm wavelength. In the first comparative example, a 7 nm thick copper layer was used as a metal layer of the sensing pattern.

Referring to the first to third curves GL1, GL2, and GL3, the sensing patterns according to the second comparative example and the inventive concept have transparency higher than that of the sensing pattern according to the first comparative example.

The metal layer may be the uppermost layer of the sensing pattern according to the first comparative example, and in this case, reflectance of light may be increased, thereby decreasing transparency of the sensing pattern. By contrast, for the sensing patterns according to the second comparative example and some embodiments of the inventive concept, the second transparent electrode layer or the resin layer EPL that is provided as a top layer of the sensing patterns may lead to interference of reflected light, and transparency may be higher than that of the sensing pattern according to the first comparative example.

Figure 8:
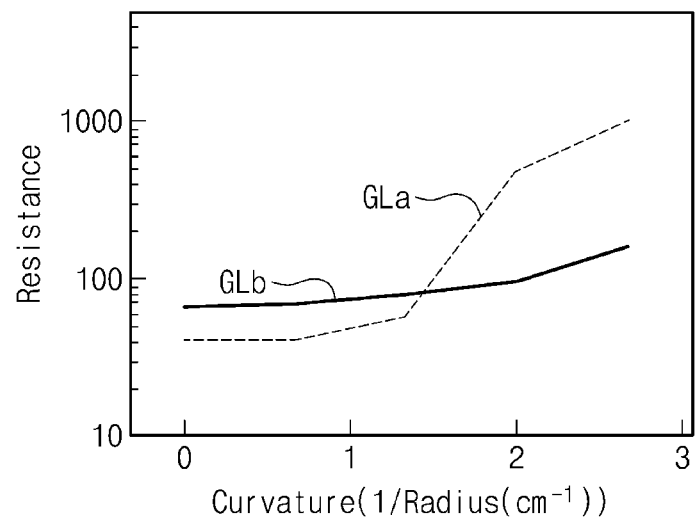
FIG. 8 is a graph showing curvature dependence of resistance.

FIG. 8 is a graph showing curvature dependence of resistance.

Referring to FIG. 8, a first curve GLa shows resistance versus curvature curve for a sensing pattern, in which a first transparent electrode layer, a metal layer, and a second transparent electrode layer are sequentially stacked, according to a comparative example, and a second curve GLb shows resistance versus curvature for the sensing pattern shown in FIG. 6.

Referring to the first and second curves GLa and GLb, when the curvature (1/Radius) was less than about 1.4 cm$^{-1}$, the resistance of the sensing pattern according to the inventive concept is greater than that of the sensing pattern according to the comparative example. However, when the curvature was larger than about 1.4 cm$^{-1}$, the resistance of the sensing pattern according to the comparative example is greater than that of the sensing pattern according to the inventive concept.

For the sensing pattern according to the comparative example, when the curvature is increased, a crack may be formed in the first or second transparent electrode layer to increase the resistance of the sensing pattern or to reduce conductivity of the sensing pattern. However, for the sensing pattern according to some embodiments of the inventive concept, the resin layer that is a top layer of the sensing pattern may be used to prevent a crack from being formed in the first or second transparent electrode layer. Accordingly, even if a small crack is formed in a transparent electrode layer by repeating a bending experiment, it may be small in scale, compared with that of the comparative example, and thus, the increase in the resistance may be suppressed. That is, according to some embodiments of the inventive concept, the sensing pattern may be configured to have a stacked structure including a transparent electrode layer, a metal layer, and a resin layer, and to the electronic apparatus EA including the sensing pattern can have improved transparency and flexibility.

Figure 9:
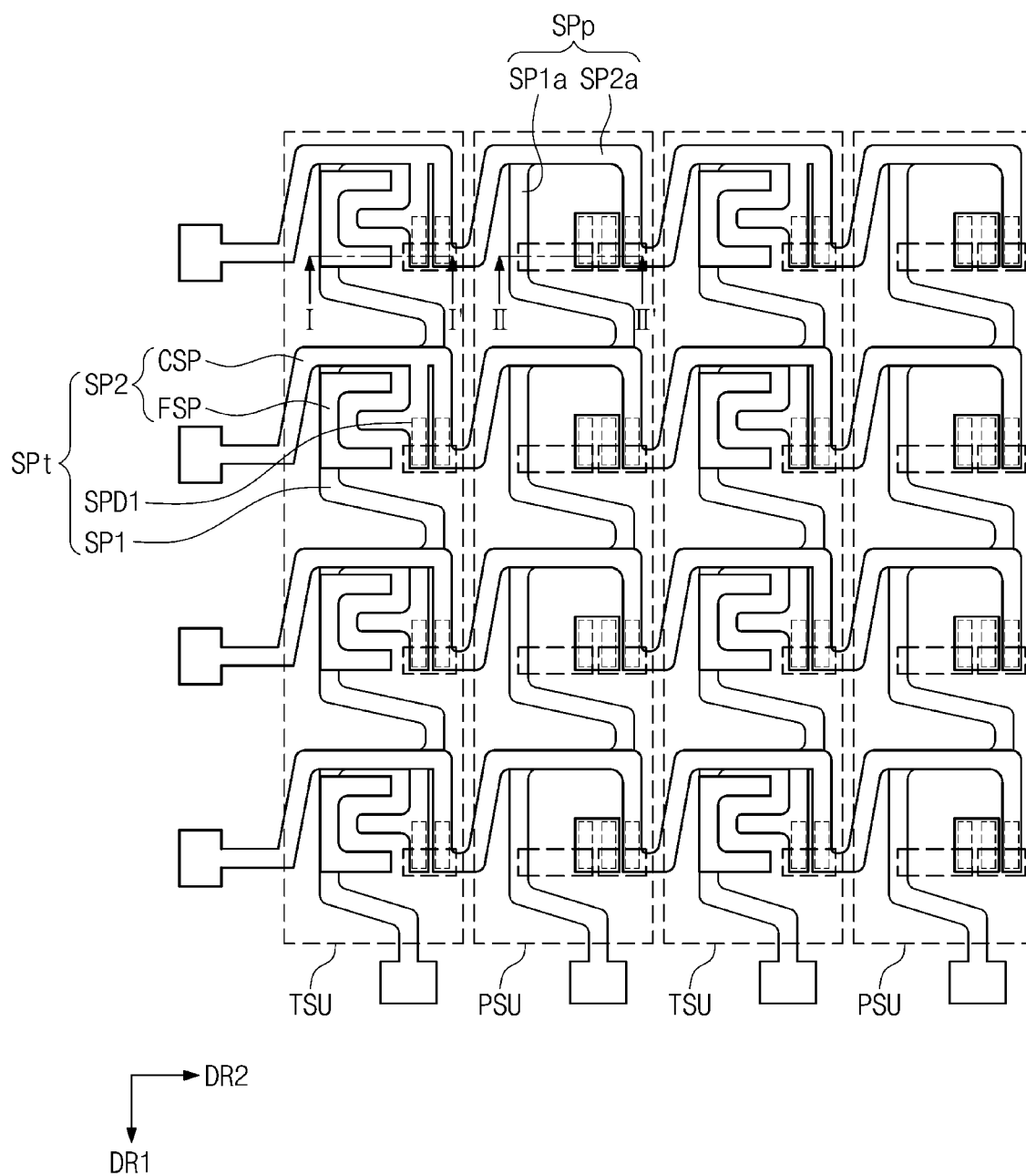
FIG. 9 is a plan view schematically illustrating a sensing unit according to some embodiments of the inventive concept.
Figure 10:
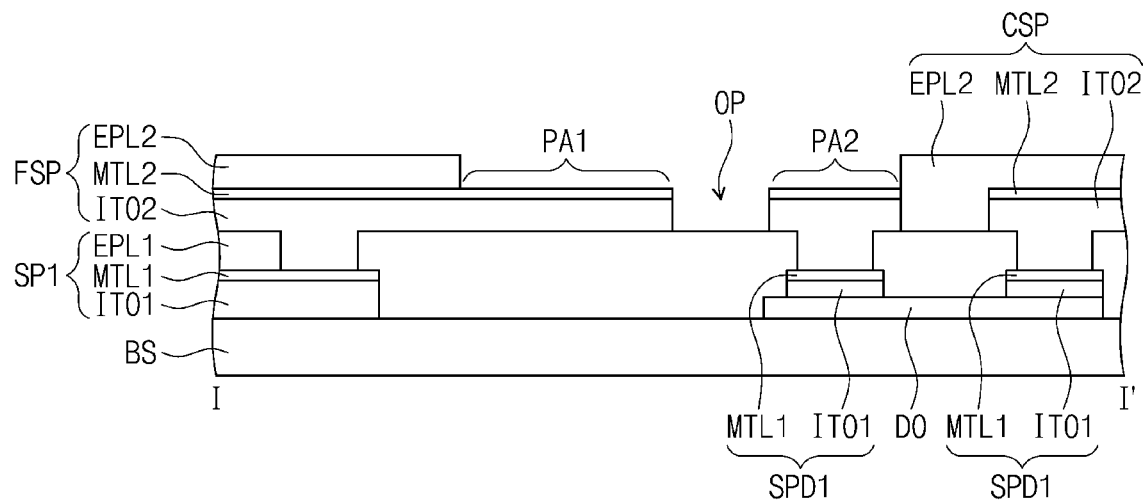
FIG. 10 is a sectional view taken along line I-I' of FIG. 9.
Figure 11:
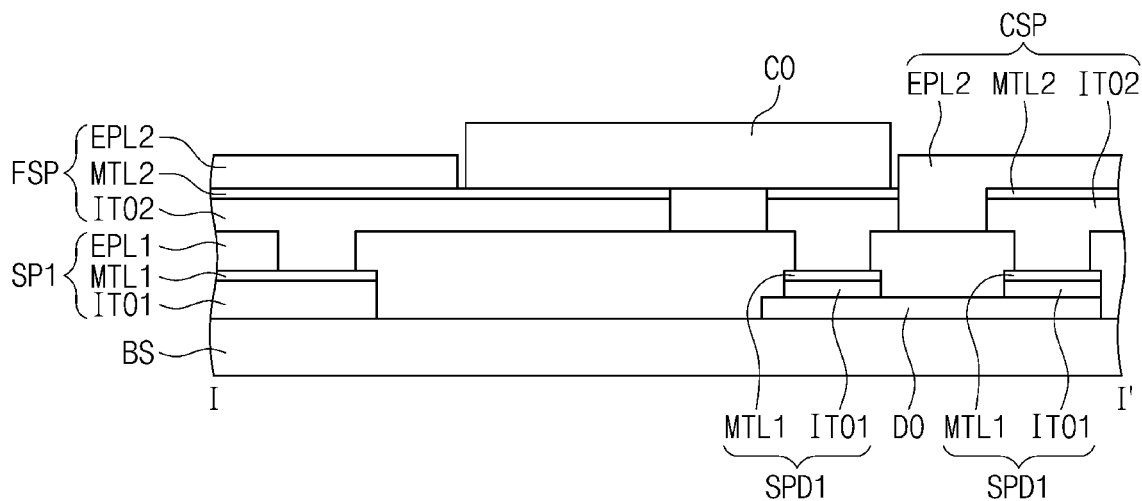
FIG. 11 is a sectional view illustrating the sensing unit of FIG. 10, to which a touch event is applied.

FIG. 9 is a plan view schematically illustrating a sensing unit according to some embodiments of the inventive concept, FIG. 10 is a sectional view taken along line I-I' of FIG. 9, and FIG. 11 is a sectional view illustrating the sensing unit of FIG. 10, to which a touch event is applied.

Referring to FIGS. 9, 10, and 11, the sensing unit SU may include the touch and pressure sensor units TSU and PSU, as described with reference to FIG. 4. The touch and pressure sensor units TSU and PSU may be alternatingly arranged in the second direction DR2, as described with reference to FIG. 5.

The touch sensor unit TSU may include a diode DO that is disposed on the base layer BS, and a touch sensing pattern SPt that is disposed on the diode DO. The touch sensing pattern SPt may include a first sensing pattern SP1, a first floating sensing pattern SPD1 and a second sensing pattern SP2 that is disposed on the first sensing pattern SP1 and the first floating sensing pattern SPD1. The second sensing pattern SP2 may include a second floating sensing pattern FSP and a connection sensing pattern CSP.

Referring to FIG. 9, the first sensing pattern SP1 may have a shape meanderingly extending in the first direction DR1, and the second sensing pattern SP2 may have a shape meanderingly extending in the second direction DR2. The meandering shape of the first and second sensing patterns SP1 and SP2 can reduce a stress that may be applied to the first and second sensing patterns SP1 and SP2 when the electronic apparatus is stretched or bent.

Referring to FIG. 10, the first sensing pattern SP1 may include a first transparent electrode layer ITO1, a first metal layer MTL1, and a first resin layer EPL1, and the second sensing pattern SP2 (i.e., each of the second floating sensing pattern FSP and the connection sensing pattern CSP) may include a second transparent electrode layer ITO2, a second metal layer MTL2, and a second resin layer EPL2.

The first floating sensing pattern SPD1 may be electrically connected to the diode DO and the connection sensing pattern CSP of the second sensing pattern SP2. The first resin layer EPL1 may be partially removed to electrically connect the first and second sensing patterns SP1 and SP2. The second floating sensing pattern FSP may be physically separated from the connection sensing pattern CSP and the first floating sensing pattern PD1.

In a region of the second sensing pattern SP2, an opening OP may be defined to allow a conductive object to be in contact with the second sensing pattern SP2. In addition, the second resin layer EPL2 may be removed to expose a first region PA1 of the second floating sensing pattern FSP and a second region PA2 of the connection sensing pattern CSP that are adjacent to the opening OP. In the case where the second sensing pattern SP2 is not in contact with the conductive object, the first region PA1 is electrically separated from the second region PA2, and thus, electric resistance between the first region PA1 of the second floating sensing pattern FSP and the second region PA2 of the connection sensing pattern CSP may be infinite.

FIG. 11 illustrates an example of the touch sensor unit TSU that is in contact with a conductive object CO. The first region PA1 of the second floating sensing pattern FSP and the second region PA2 of the connection sensing pattern CSP may be electrically connected to each other by the conductive object CO. In this case, the touch sensor unit TSU can obtain information on a position of a touch event by detecting a change of the electric resistance when the conductive object CO electrically connects the first region PA1 and the second region PA2.

Figure 12:
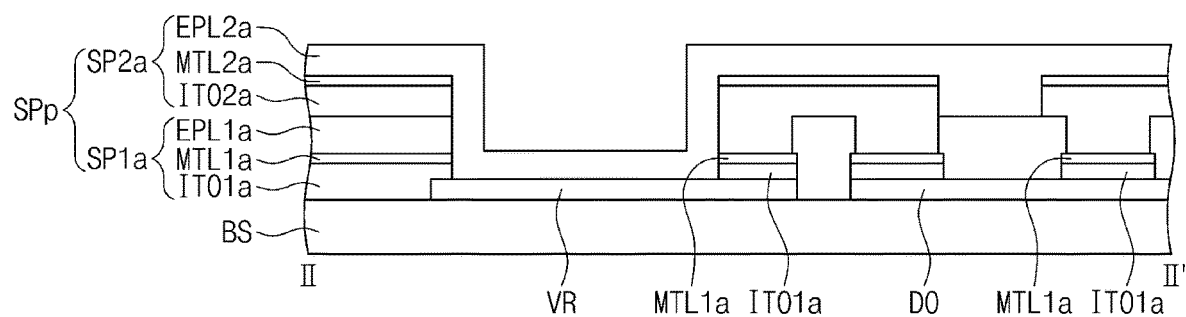
FIG. 12 is a sectional view taken along line II-II' of FIG. 9.
Figure 13:
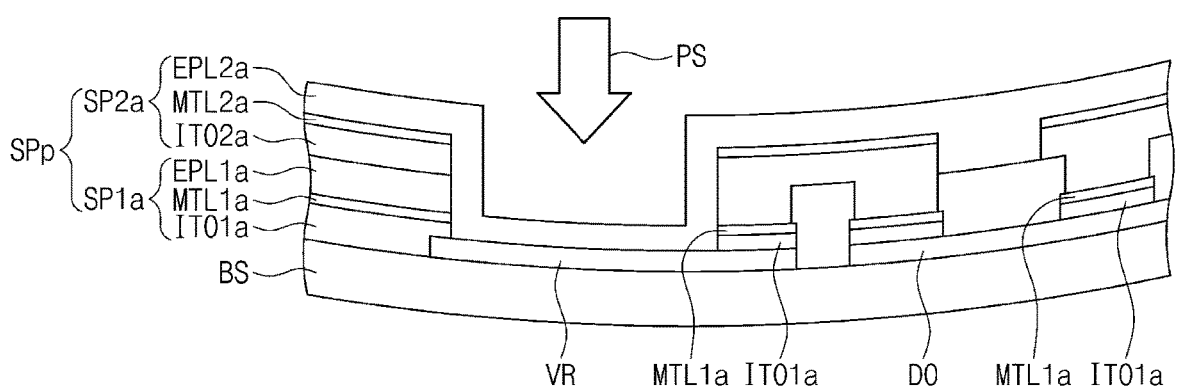
FIG. 13 is a sectional view illustrating the sensing unit of FIG. 12, to which a touch event is applied.

FIG. 12 is a sectional view taken along line II-II' of FIG. 9, and FIG. 13 is a sectional view illustrating the sensing unit of FIG. 12, to which a touch event is applied.

Referring to FIGS. 9, 12, and 13, the pressure sensor unit PSU may include the diode DO, a strain gauge VR, and a pressure sensing pattern SPp. The pressure sensing pattern SPp may include a first sensing pattern SP1$a$ and a second sensing pattern SP2$a$ that is disposed on the first sensing pattern SP1$a$.

Similar to the first and second sensing patterns SP1 and SP2 of FIG. 10, the first sensing pattern SP1$a$ may have a shape meanderingly extending in the first direction DR1, and the second sensing pattern SP2$a$ may have a shape meanderingly extending in the second direction DR2.

The first sensing pattern SP1$a$ may include a first transparent electrode layer ITO1$a$, a first metal layer MTL1$a$, and a first resin layer EPL1$a$, and the second sensing pattern SP2$a$ may include a second transparent electrode layer ITO2$a$, a second metal layer MTL2$a$, and a second resin layer EPL2$a$. The first sensing pattern SP1$a$ may be electrically connected to the strain gauge VR and may be used to sense a change in resistance of the strain gauge VR.

FIG. 13 illustrates an example of the pressure sensor unit PSU, to which a pressure is applied. If the strain gauge VR is deformed by an external force PS, resistance of the strain gauge VR may be changed. In this case, the pressure sensor unit PSU can measure a magnitude of an external touch event.

Figure 14A:
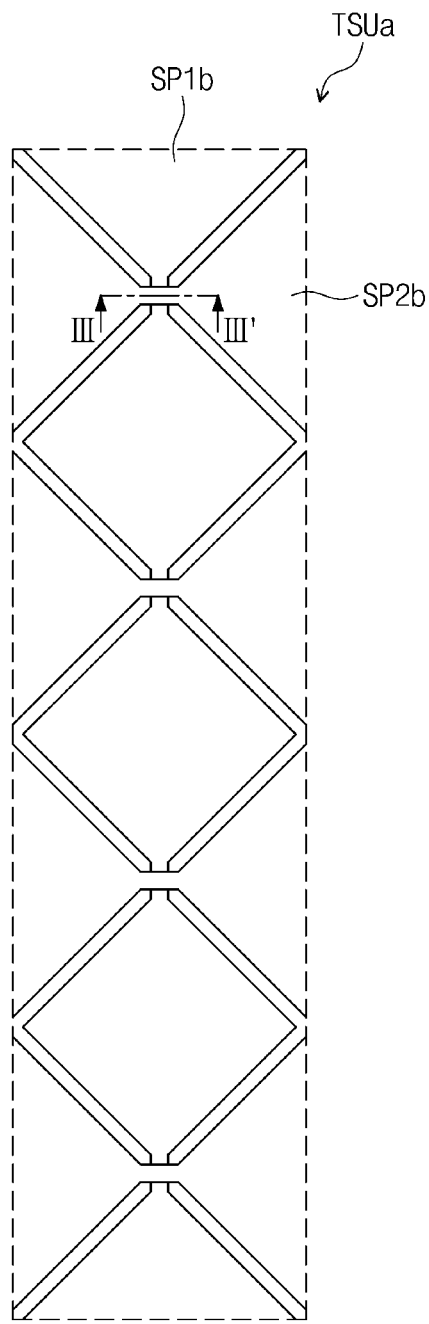
FIG. 14A is a plan view illustrating a portion of a sensing unit according to some embodiments of the inventive concept.
Figure 14B:
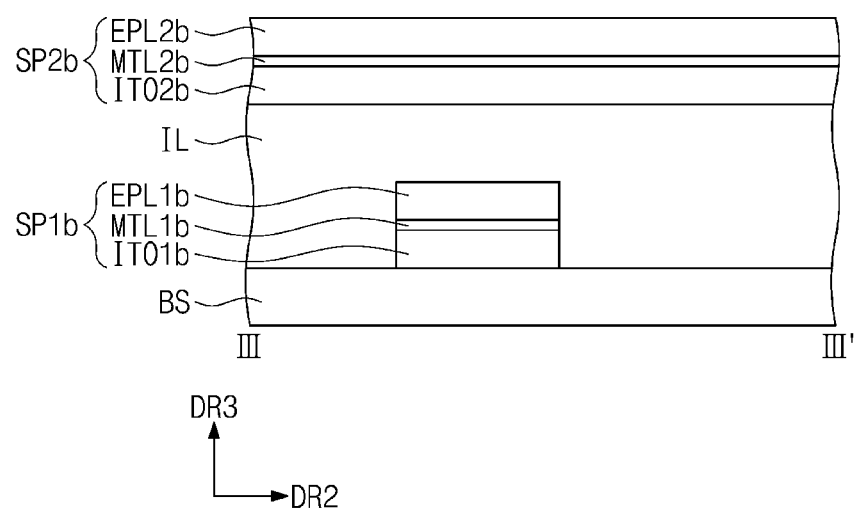
FIG. 14B is a sectional view taken along line of FIG. 14A.

FIG. 14A is a plan view illustrating a portion of a sensing unit according to some embodiments of the inventive concept, and FIG. 14B is a sectional view taken along line III-III' of FIG. 14A. In detail, FIG. 14A is an enlarged plan view of a portion of a touch sensor unit.

Referring to FIGS. 14A and 14B, a touch sensor unit TSUa may include a first sensing pattern SP1$b$ and a second sensing pattern SP2$b$. The touch sensor unit TSUa may be configured to sense an external touch event using an electrostatic capacitive coupling between the first and second sensing patterns SP1$b$ and SP2$b$; that is, the touch sensor unit TSUa may be operated in an electrostatic capacitance manner In this case, the touch sensor unit TSUa may obtain position coordinates of a touch event, in a self-capacitance or mutual-capacitance manner.

The second sensing pattern SP2$b$ may be used to output a sensing signal, and the first sensing pattern SP1$b$ may be used to receive a driving signal. The sensing signal output from the second sensing pattern SP2$b$ may be used to obtain information on a region, at which a touch event occurs. However, the inventive concept is not limited thereto. For example, the second sensing pattern SP2$b$ may be used to receive the driving signal, and the first sensing pattern SP1$b$ may be used to output the sensing signal. In some embodiments, each of the first and second sensing patterns SP1$b$ and SP2$b$ may be used to receive or output other electrical signals.

An insulating layer IL may be disposed between the first and second sensing patterns SP1$b$ and SP2$b$. Thus, the first and second sensing patterns SP1$b$ and SP2$b$ may be provided at different levels or on different layers.

The first sensing pattern SP1$b$ may include a first transparent electrode layer ITO1$b$, a metal layer MTL1$b$, and a first resin layer EPL1$b$, and the second sensing pattern SP2$b$ may include a second transparent electrode layer ITO2$b$, a second metal layer MTL2$b$, and a second resin layer EPL2$b$. The first transparent electrode layer ITO1$b$ and the second transparent electrode layer ITO2$b$ may be formed of or include indium tin oxide (ITO), the first metal layer MTL1$b$ and the second metal layer MTL2$b$ may be formed of or include copper, and the first resin layer EPL1$b$ and the second resin layer EPL2$b$ may be formed of or include at least one of epoxy resins.

The first and second resin layers EPL1$b$ and EPL2$b$ can improve transparency of the first and second sensing patterns SP1$b$ and SP2$b$. In addition, the improved flexibility of the first and second sensing patterns SP1$b$ and SP2$b$ having a stacked structure including a transparent electrode layer, a metal layer, and a resin layer can prevent or suppress a crack from being formed in the first and second sensing patterns SP1$b$ and SP2$b$.

Figure 15A:
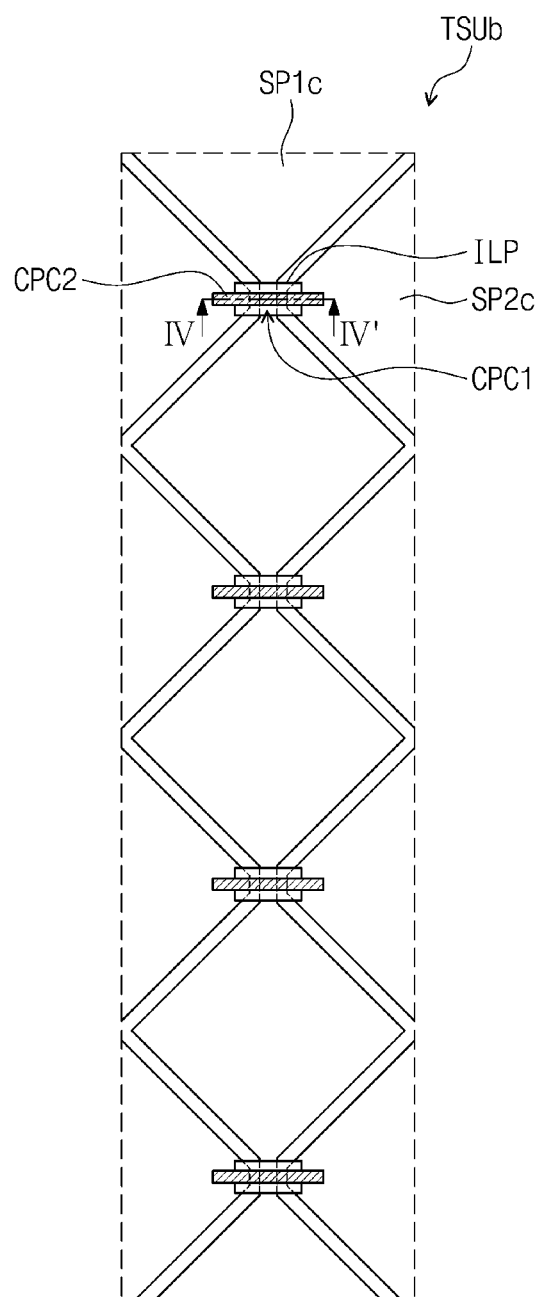
FIG. 15A is a plan view illustrating a portion of a sensing unit according to some embodiments of the inventive concept.
Figure 15B:
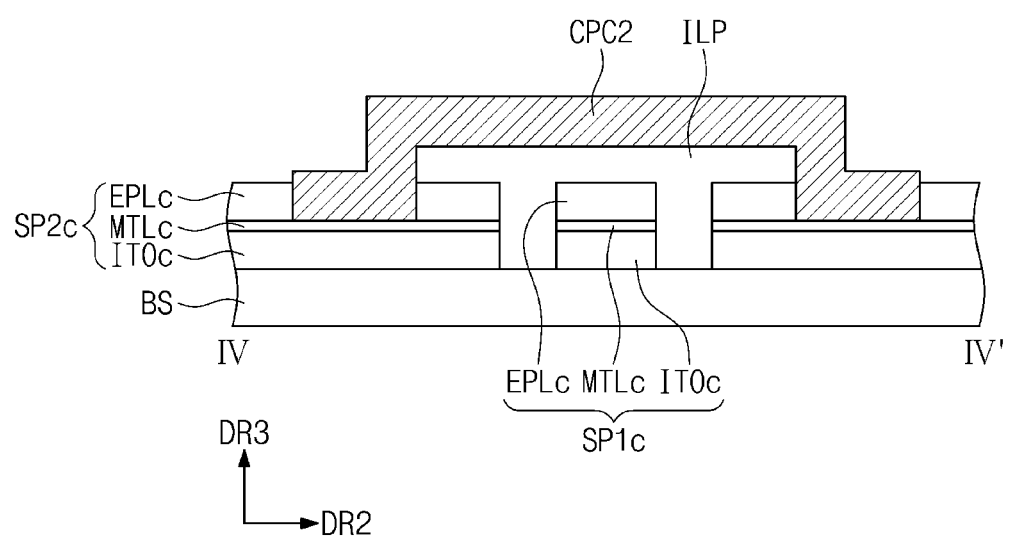
FIG. 15B is a sectional view taken along line IV-IV' of FIG. 15A.

FIG. 15A is a plan view illustrating a portion of a sensing unit according to some embodiments of the inventive concept and FIG. 15B is a sectional view taken along line IV-IV' of FIG. 15A.

Referring to FIGS. 15A and 15B, a touch sensor unit TSUb may include a first sensing pattern SP1$c$ and a second sensing pattern SP2$c$. The first sensing pattern SP1$c$, the second sensing pattern SP2$c$, and a first connecting portion CPC1 of the first sensing pattern SP1$c$ may be formed on the same layer by using the same process. Each of the first sensing pattern SP1$c$ and the second sensing pattern SP2$c$ may include a transparent electrode layer ITOc, a metal layer MTLc, and a resin layer EPLc.

An insulating pattern ILP may be disposed on the first connecting portion CPC1 of the first sensing pattern SP1$c$. A second connecting portion CPC2 may be disposed on the insulating pattern ILP to connect adjacent second sensing patterns SP2$c$ to each other. The first connecting portion CPC1 and the second connecting portion CPC2 may be spaced apart from each other in a third direction DR3 by the insulating pattern ILP. In some embodiments, a plurality of the insulating patterns ILP may be provided at respective intersections of the first and second connecting portions CPC1 and CPC2, and each of the first and second sensing patterns SP1$c$ and SP2$c$ may have an island shape.

The second connecting portion CPC2 may include a metal material (e.g., molybdenum, silver, titanium, copper, aluminum, or alloys thereof). However, the inventive concept is not limited thereto, and the second connecting portion CPC2 may have the same layer structure as that of the first connecting portion CPC1. The resin layer EPLc may include holes connecting the second connecting portion CPC2 to the metal layer MTLc of the adjacent second sensing patterns SP2$c$. For example, the second connecting portion CPC2 may be electrically connected to the adjacent second sensing patterns SP2c through the holes.

Figure 16A:
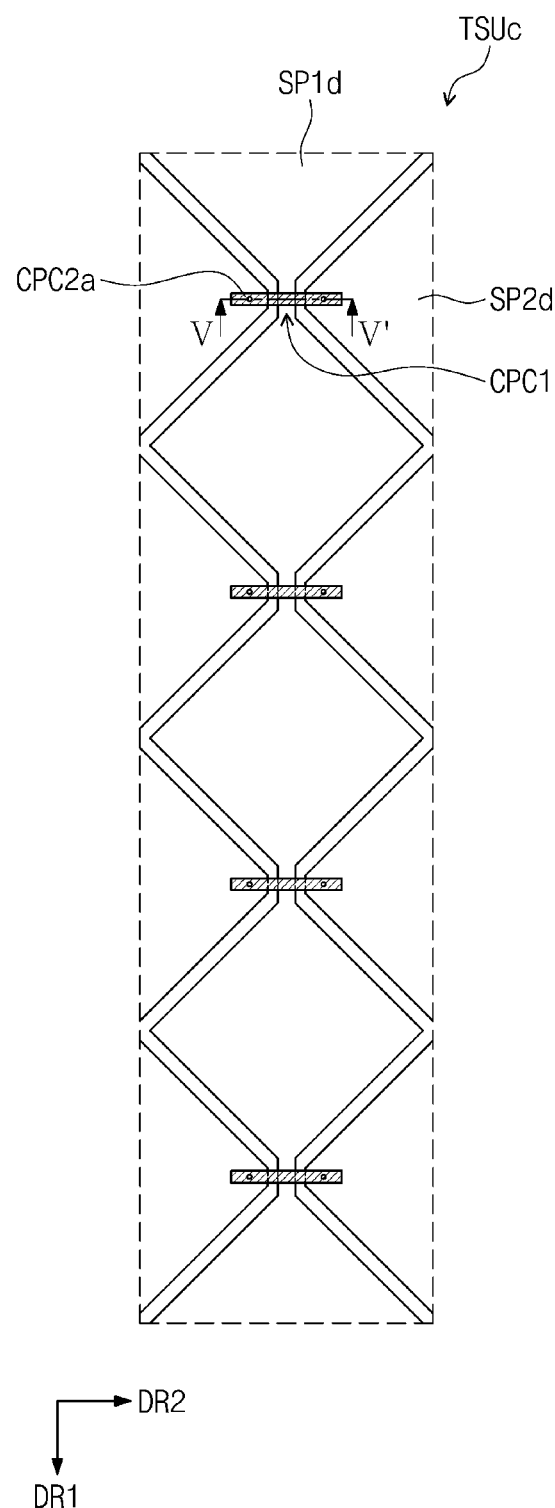
FIG. 16A is a plan view illustrating a portion of a sensing unit according to some embodiments of the inventive concept.
Figure 16B:
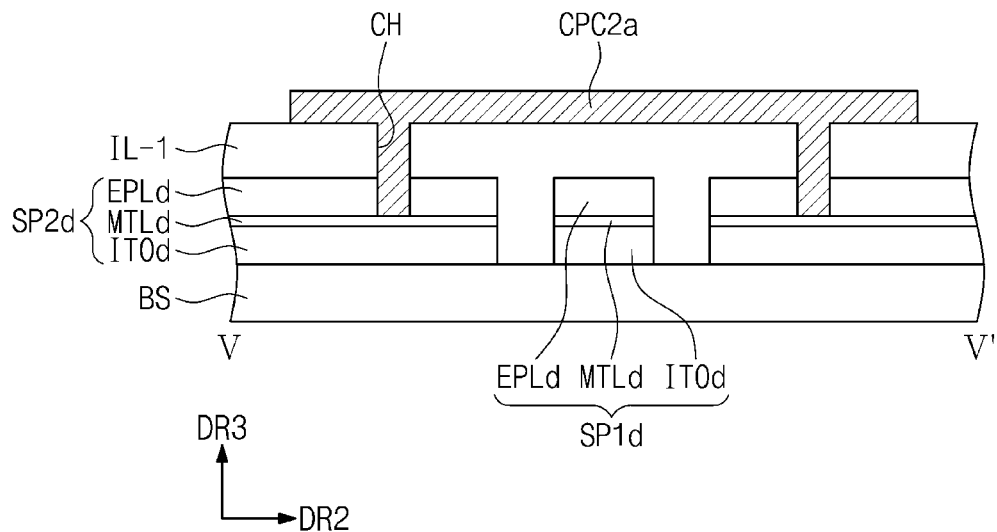
FIG. 16B is a sectional view of a sensing unit taken along line V-V' of FIG. 16A.

FIG. 16A is a plan view illustrating a portion of a sensing unit according to some embodiments of the inventive concept, and FIG. 16B is a sectional view taken along line V-V' of FIG. 16A.

Referring to FIGS. 16A and 16B, a touch sensor unit TSUc may include a first sensing pattern SP1d and a second sensing pattern SP2d. The first sensing pattern SP1d, the second sensing pattern SP2d, and a first connecting portion CPC1 of the first sensing pattern SP1d may be formed on the same layer by using the same process.

The second connecting portion CPC2a may be spaced apart from the first connecting portion CPC1 in the third direction DR3, and an insulating layer IL-1 may be interposed between the first connecting portion CPC1 and the second connecting portion CPC2a. The insulating layer IL-1 may be provided to cover the first sensing pattern SP1d, the second sensing pattern SP2d, and the first connecting portion CPC1 of the first sensing pattern SP1d.

Each of the first sensing pattern SP1d and the second sensing pattern SP2d may include a transparent electrode layer ITOd, a metal layer MTLd, and a resin layer EPLd.

Penetration holes CH may be formed to penetrate the insulating layer IL-1 and the resin layer EPLd, and the second connecting portion CPC2a may be coupled to each of the adjacent second sensing patterns SP2d through the penetration holes CH. The second connecting portion CPC2a may include a metal material (e.g., molybdenum, silver, titanium, copper, aluminum, or alloys thereof). However, the inventive concept is not limited thereto, and the second connecting portion CPC2a may have the same layer structure as that of the first connecting portion CPC1.

Figure 16C:
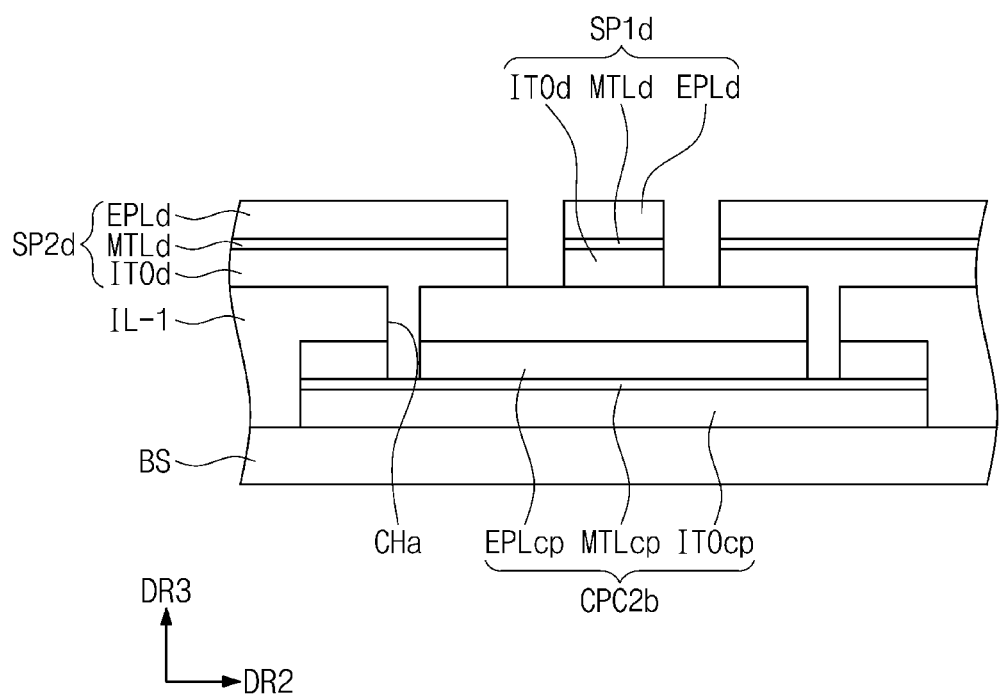
FIG. 16C is a sectional view of a sensing unit taken along line V-V' of FIG. 16A according to another embodiment.

FIG. 16C is a sectional view of a sensing unit taken along line V-V' of FIG. 16A according to another embodiment.

The structure of FIG. 16C may be different from that of FIG. 16B in terms of a position of the second connecting portion CPC2b. For example, the second connecting portion CPC2b may be located below the insulating layer IL-1. The first sensing pattern SP1d, the second sensing pattern SP2d, and the first connecting portion of the first sensing pattern SP1d may be located on the insulating layer IL-1. The adjacent second sensing patterns SP2d in the second direction DR2 may be coupled to the second connecting portion CPC2b through penetration holes CHa.

In addition, as shown in FIG. 16C, a second connecting portion CPC2b may have the same layer structure as that of the first sensing pattern SP1d. In other words, the second connecting portion CPC2b may include a transparent electrode layer ITOcp, a metal layer MTLcp, and a resin layer EPLcp. In this case, the penetration holes CHa may penetrate not only the insulating layer IL-1 but also the resin layer EPLcp of the second connecting portion CPC2b.

According to some embodiments of the inventive concept, a sensing unit may include sensing patterns, each of which includes a resin layer to increase transparency of the sensing pattern and thus to prevent or suppress the sensing pattern from being perceived by a user. In addition, the resin layer included in the sensing patterns can increase the flexibility of the sensing pattern and consequently reduce the risk of crack occurrence.

While example embodiments of the inventive concepts have been particularly shown and described, it will be understood by one of ordinary skill in the art that variations in form and detail may be made therein without departing from the spirit and scope of the attached claims.

What is claimed is:

1. An electronic apparatus, comprising:
a base layer; and
a sensing unit disposed on the base layer to sense a touch event,
wherein the sensing unit comprises:
a touch sensor unit configured to sense a position of the touch event, the touch sensor unit comprising a touch sensing pattern including a first transparent electrode layer, a first metal layer disposed on the first transparent electrode layer, and a first resin layer disposed on the first metal layer; and
a pressure sensor unit configured to sense a magnitude of the touch event, the pressure sensor unit comprising a pressure sensing pattern including a second transparent electrode layer, a second metal layer disposed on the second transparent electrode layer, and a second resin layer disposed on the second metal layer.

2. The electronic apparatus of claim 1, wherein the touch sensor unit and the pressure sensor unit extend in a first direction and are alternatingly arranged in a second direction crossing the first direction.

3. The electronic apparatus of claim 1, wherein each of the first transparent electrode layer and the second transparent electrode layer comprises indium tin oxide (ITO).

4. The electronic apparatus of claim 1, wherein each of the first metal layer and the second metal layer comprises copper.

5. The electronic apparatus of claim 1, wherein each of the first resin layer and the second resin layer comprises an epoxy resin.

6. The electronic apparatus of claim 1, wherein a thickness of the first metal layer is smaller than that of each of the first resin layer and the first transparent electrode layer, and
a thickness of the second metal layer is smaller than that of each of the second resin layer and the second transparent electrode layer.

7. The electronic apparatus of claim 6, wherein the thickness of each of the first metal layer and the second metal layer ranges from 5 nm to 9 nm.

8. The electronic apparatus of claim 6, wherein the thickness of each of the first resin layer and the second resin layer is approximately 70 nm.

9. The electronic apparatus of claim 1, wherein the touch sensing pattern comprises a first sensing pattern and a first floating sensing pattern that are disposed on the base layer and a second sensing pattern that are disposed on the first sensing pattern and the first floating sensing pattern, and
each of the first sensing pattern, the first floating sensing pattern, and the second sensing pattern comprises the first transparent electrode layer, the first metal layer disposed on the first transparent electrode layer, and the first resin layer disposed on the first metal layer.

10. The electronic apparatus of claim 9, wherein the second sensing pattern comprises a connection sensing pattern and a second floating sensing pattern,
the connection sensing pattern is electrically connected to the first floating sensing pattern, and
the second floating sensing pattern is physically separated from the connection sensing pattern.

11. The electronic apparatus of claim 10, wherein the first resin layer is removed from a first region of the second floating sensing pattern and a second region of the connection sensing pattern that is adjacent to the first region to expose a first portion of the first metal layer in the first region and a second portion of the first metal layer in the second region, and the second floating sensing pattern and the connection sensing pattern are electrically connected to each other when a conductive object is in contact with the exposed first and second portions of the first metal layer in the first and second regions.

12. The electronic apparatus of claim 1, wherein the pressure sensing pattern comprises a strain gauge that is disposed on the base layer, and a sensing pattern that is connected to the strain gauge, and the sensing pattern comprises the second transparent electrode layer, the second metal layer disposed on the second transparent electrode layer, and the second resin layer disposed on the second metal layer.

13. The electronic apparatus of claim 1, wherein the touch sensing pattern comprises a first sensing pattern and a second sensing pattern, and the touch sensing unit is configured to sense a touch event through an electrostatic capacitive coupling between the first sensing pattern and the second sensing pattern.

14. The electronic apparatus of claim 13, further comprising an insulating layer disposed between the first sensing pattern and the second sensing pattern, wherein each of the first sensing pattern and the second sensing pattern comprises the first transparent electrode layer, the first metal layer disposed on the first transparent electrode layer, and the first resin layer disposed on the first metal layer.

15. The electronic apparatus of claim 13, wherein the first sensing pattern and the second sensing pattern are provided at a same level, and each of the first sensing pattern and the second sensing pattern comprises the first transparent electrode layer, the first metal layer disposed on the first transparent electrode layer, and the first resin layer disposed on the first metal layer.

16. The electronic apparatus of claim 1, further comprising a display panel that is disposed below the base layer and is used to display an image.

17. The electronic apparatus of claim 1, wherein the base layer is flexible.

18. The electronic apparatus of claim 1, wherein each of the touch sensing pattern and the pressure sensing pattern has a shape meanderingly extending in a predetermined direction.

19. An electronic apparatus, comprising:

a base layer having a flexible property;

first sensing patterns comprising a first transparent electrode layer disposed on the base layer, a first metal layer directly disposed on the first transparent electrode layer, and a first resin layer directly disposed on the first metal layer;

an insulating layer covering the first sensing patterns; and second sensing patterns comprising a second transparent electrode layer disposed on the insulating layer, a second metal layer directly disposed on the second transparent electrode layer, and a second resin layer directly disposed on the second metal layer.

20. The electronic apparatus of claim 19, wherein each of the first and second sensing patterns comprises a first portion that is used to sense a position of a touch event, and a second portion that is used to sense a magnitude of the touch event.

* * * * *